US010631217B2

(12) United States Patent
Lin (10) Patent No.: US 10,631,217 B2
(45) Date of Patent: Apr. 21, 2020

(54) METHOD FOR PRE-EMPTING WIRELESS RESOURCE, WIRELESS COMMUNICATION SYSTEM AND RADIO ACCESS NODE

(71) Applicant: Industrial Technology Research Institute, Hsinchu (TW)

(72) Inventor: Chia-Nan Lin, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 134 days.

(21) Appl. No.: 15/840,169

(22) Filed: Dec. 13, 2017

(65) Prior Publication Data
US 2019/0182735 A1 Jun. 13, 2019

(51) Int. Cl.
| | | |
|---|---|---|
| *H04W 36/14* | (2009.01) | |
| *H04W 24/10* | (2009.01) | |
| *H04W 72/10* | (2009.01) | |
| *H04W 72/12* | (2009.01) | |
| *H04W 36/22* | (2009.01) | |

(52) U.S. Cl.
CPC .......... *H04W 36/14* (2013.01); *H04W 24/10* (2013.01); *H04W 72/10* (2013.01); *H04W 72/1247* (2013.01); *H04W 36/22* (2013.01); *H04W 72/1231* (2013.01)

(58) Field of Classification Search
None
See application file for complete search history.

(56) References Cited

U.S. PATENT DOCUMENTS

| | | | |
|---|---|---|---|
| 9,191,974 B2 | 11/2015 | Chaudhuri et al. | |
| 9,253,704 B1 * | 2/2016 | Sarkar ................... | H04W 36/00 |
| 9,560,656 B2 | 1/2017 | Damnjanovic et al. | |
| 9,681,352 B2 | 6/2017 | Vesely et al. | |
| 9,750,043 B2 | 8/2017 | Lee et al. | |
| 2015/0049606 A1 | 2/2015 | So et al. | |

(Continued)

FOREIGN PATENT DOCUMENTS

| | | |
|---|---|---|
| TW | 200814586 A | 3/2008 |
| TW | 200814816 A | 3/2008 |

(Continued)

OTHER PUBLICATIONS

"Consideration on subsequent transmission after pre-emption", Huawei, HISilicon, Jun. 2017, pp. 1-8, China.
"Next Generation Protocols (NGP); Scenario Definitions, " ETSI Industry Specification Group on (NGP ISG), May 2017, pp. 1-113, ETSI, France.

(Continued)

*Primary Examiner* — Adnan Baig (57) ABSTRACT

A method for pre-empting a wireless resource is provided in the invention. The method is applied to a communication system. The method includes the steps of transmitting, using the plurality of UE in a first network, measurement reports of a plurality of user equipment (UE) to a radio access node wherein the first network is provided by the radio access node; according to the priority level of the UE bearer corresponding to each UE, selecting a plurality of candidate UE bearers from all of the UE bearers; determining whether the UE corresponding to each of the candidate UE bearers can connect to other heterogeneous networks; and selecting one of the candidate UE bearers corresponding to the UE which can connect to other heterogeneous networks to perform the pre-emption.

28 Claims, 6 Drawing Sheets

(56) References Cited

U.S. PATENT DOCUMENTS

| | | | |
|---|---|---|---|
| 2015/0110048 A1* | 4/2015 | Damnjanovic | H04W 72/048 370/329 |
| 2016/0212672 A1 | 7/2016 | Fu et al. | |
| 2016/0242059 A1 | 8/2016 | Lopes et al. | |
| 2017/0118795 A1* | 4/2017 | Guo | H04W 76/36 |
| 2017/0127306 A1 | 5/2017 | Tan Bergstrom et al. | |

FOREIGN PATENT DOCUMENTS

| | | |
|---|---|---|
| TW | I351189 | 10/2011 |
| TW | 201446021 A | 12/2014 |
| TW | I535326 | 5/2016 |
| TW | I593302 | 7/2017 |
| TW | 201733319 A | 9/2017 |
| WO | WO 2015148816 A1 | 10/2015 |

OTHER PUBLICATIONS

Taiwan Patent Office, Office Action, Patent Application Serial No. 16143705, dated Jul. 25, 2018, Taiwan.

Jie Zeng et al., "Admission Control Strategy in LTE-A and WLAN Integrated Network," 2015 24$^{th}$ Wireless and Optical Communication Conference, Oct. 2015, pp. 103-107, IEEE, US.

Mehdi Khabazian et al., "A Fairness-Based Preemption Algorithm for LTE-Advanced," 2012 IEEE Global Communications Conference, Dec. 2012, pp. 5320-5325, IEEE, US.

Yuji Kojima et al., "LTE-WiFi Link Aggregation at Femtocell Base Station," Proceedings of WTC 2014, Jun. 2014, pp. 1-6, VDE, Germany.

Boram Jin et al., "Aggregating LTE and Wi-Fi: Fairness and Split-Scheduling," 2016 14$^{th}$ International Symposium on Modeling and Optimization in Mobile, Ad Hoc, and Wireless Networks, May 2016, pp. 1-8, IEEE, US.

Sarabjot Singh et al., "Proportional Fair Traffic Splitting and Aggregation in Heterogeneous Wireless Networks," IEEE Communications Letters, May 2016, pp. 1010-1013, vol. 20, issue 5, IEEE, US.

Vladimir Y. Borodakiy et al., "Modelling and Performance Analysis of Pre-emption Based Radio Admission Control Scheme for Video Conferencing over LTE," Proceedings of the ITU Kaleidoscope Academic Conference: Living in a converged world—Impossible without standards?, Jun. 2014, 7 pages, IEEE, US.

Saloua Hendaoui et al, "QoS aware pre-emption: A New Proposition for LTE Downlink Schedulers," 2014 11$^{th}$ International Symposium on Wireless Communications Systems, Aug. 2014, pp. 744-749, IEEE, US.

Raymond Kwan et al., "On Pre-Emption and Congestion Control for LTE Systems," 2010 IEEE 72$^{nd}$ Vehicular Technology Conference Fall, Sep. 2010, 5 pages, IEEE, US.

Adlen Ksentini et al., "QoE-Based Flow Admission Control in Small Cell Networks," IEEE Transactions on Wireless Communications, Apr. 2016, pp. 2474-2483, vol. 15, issue 4, IEEE, US.

Aymen Belghith et al., "Flexible Call Admission Control with Preemption in LTE Networks," 2016 IEEE International Conference on Communications, May 2016, 7 pages, IEEE, US.

Duk Kyung Kim et al., "A New Call Admission Control Scheme for Heterogeneous Wireless Networks," IEEE Transactions on Wireless Communications, Oct. 2010, pp. 3000-3005, vol. 9, issue 10, IEEE, US.

* cited by examiner

METHOD FOR PRE-EMPTING WIRELESS RESOURCE, WIRELESS COMMUNICATION SYSTEM AND RADIO ACCESS NODE

TECHNICAL FIELD

The invention generally relates to technology for pre-empting the wireless resource, and more particularly, to a technology for pre-empting the wireless resource which is performed by determining whether the user equipment (UE) bearer with lower priority level is able to connect to other heterogeneous networks to determine which UE bearer to pre-empt.

BACKGROUND

As mobile communication network technology progresses, how to use the spectrum resource efficiently and achieve the interoperability of different wireless communication technologies to increase the diversity of the future wireless network environment is becoming an important target.

In order to make the Long Term Evolution (LTE) can be applied in the unlicensed band, the LTE-Unlicensed (LTE-U), Licensed Assisted Access (LAA), MulteFire and other related technologies are becoming mature and opened officially. Furthermore, the spectrum sharing technologies of Licensed Shared Access (LSA)/Citizens Broadband Radio Service (CBRS) which are operated in the 2.3/3.5 GHz band respectively also can be applied in the LTE network.

As more and more terminal devices are connected to the network, the wireless resources may be exhausted. Therefore, in the 3GPP standard, the radio access node (RAN) may perform the pre-emption process according to the Allocation and Retention Priority (ARP) parameters to release the wireless resource of the UE bearer with lower priority level and provide the wireless resource to the UE bearer with higher priority level.

In the mechanism of the current pre-emption process, when there are not enough wireless resources and the pre-emption process needs to be performed, the RAN may select a UE bearer with a lower priority level and release its wireless resource to provide the service (wireless resource) to the UE bearer with a higher priority level. However, the UE corresponding to the UE bearer whose wireless resource is pre-empted may not connect to other heterogeneous networks to access the internet continuously. As a result, the service quality may be reduced.

BRIEF SUMMARY

A method for pre-empting the wireless resource and wireless communication network are provided to overcome the problems described above.

An embodiment in accordance with the disclosure provides a method for pre-empting the wireless resource. The method for pre-empting the wireless resource is applied to a wireless communication system. The method for pre-empting the wireless resource comprises the steps of transmitting measurement reports of the UEs to a radio access node (RAN) in a first network by a plurality of user equipment (UEs), wherein the first network is provided by the RAN; according to priority levels of UE bearers corresponding to each of the UEs, selecting a plurality of candidate UE bearers from all of the UE bearers; according to the measurement reports of the UEs corresponding to the candidate UE bearers, determining whether the UEs corresponding to each of the candidate UE bearers are able to connect to other heterogeneous networks; and selecting one of the candidate UE bearers corresponding to the UEs which are able to connect to other heterogeneous networks to perform a pre-emption.

An embodiment in accordance with the disclosure provides a method for pre-empting the wireless resource. The method for pre-empting the wireless resource is applied to a radio access node (RAN). The method for pre-empting the wireless resource comprises the steps of receiving measurement reports of a plurality of user equipment (UEs) in a first network, wherein the first network is provided by the RAN; according to priority levels of UE bearers corresponding to each of the UEs, selecting a plurality of candidate UE bearers from all of the UE bearers; according to the measurement reports of the UEs corresponding to the candidate UE bearers, determining whether the UEs corresponding to each of the candidate UE bearers are able to connect to other heterogeneous networks; and selecting one of the candidate UE bearers corresponding to the UEs which are able to connect to other heterogeneous networks to perform a pre-emption.

An embodiment in accordance with the disclosure provides a wireless communication system. The wireless communication system comprises a plurality of user equipment (UEs) and a radio access node (RAN). The provides a first network to the UEs, receives measurement reports of the UEs, and according to priority levels of UE bearers corresponding to each of the UEs, selects a plurality of candidate UE bearers from all of the UE bearers. The RAN determines whether the UEs corresponding to each of the candidate UE bearers are able to connect to other heterogeneous networks, and according to the measurement reports of the UEs which are able to connect to other heterogeneous networks, the RAN selects one of the candidate UE bearers corresponding to the UEs which are able to connect to other heterogeneous networks to perform a pre-emption.

An embodiment in accordance with the disclosure provides a radio access node (RAN). The RAN comprises a transceiver device and a processing device. The transceiver device provides a first network to a plurality of user equipment (UEs) and receives measurement reports of the UEs. The processing device selects a plurality of candidate UE bearers from all of the UE bearers according to priority levels of the UE bearers corresponding to each of the UEs. The processing device determines whether the UEs corresponding to each of the candidate UE bearers are able to connect to other heterogeneous networks, and according to the measurement reports of the UEs which are able to connect to other heterogeneous networks, the processing device selects one of the candidate UE bearers corresponding to the UEs which are able to connect to other heterogeneous networks to perform a pre-emption.

Other aspects and features of the invention will become apparent to those with ordinary skill in the art upon review of the following descriptions of specific embodiments of methods for pre-empting the wireless resource and wireless communication system.

BRIEF DESCRIPTION OF THE DRAWINGS

The disclosure will become more fully understood by referring to the following detailed description with reference to the accompanying drawings, wherein.

DESCRIPTION OF THE EMBODIMENTS

The descriptions of the disclosure are some embodiments for the purpose of illustrating the general principles of the disclosure and should not be configured to limit the disclosure. The scope of the invention is determined by reference to the appended claims.

Figure 1:
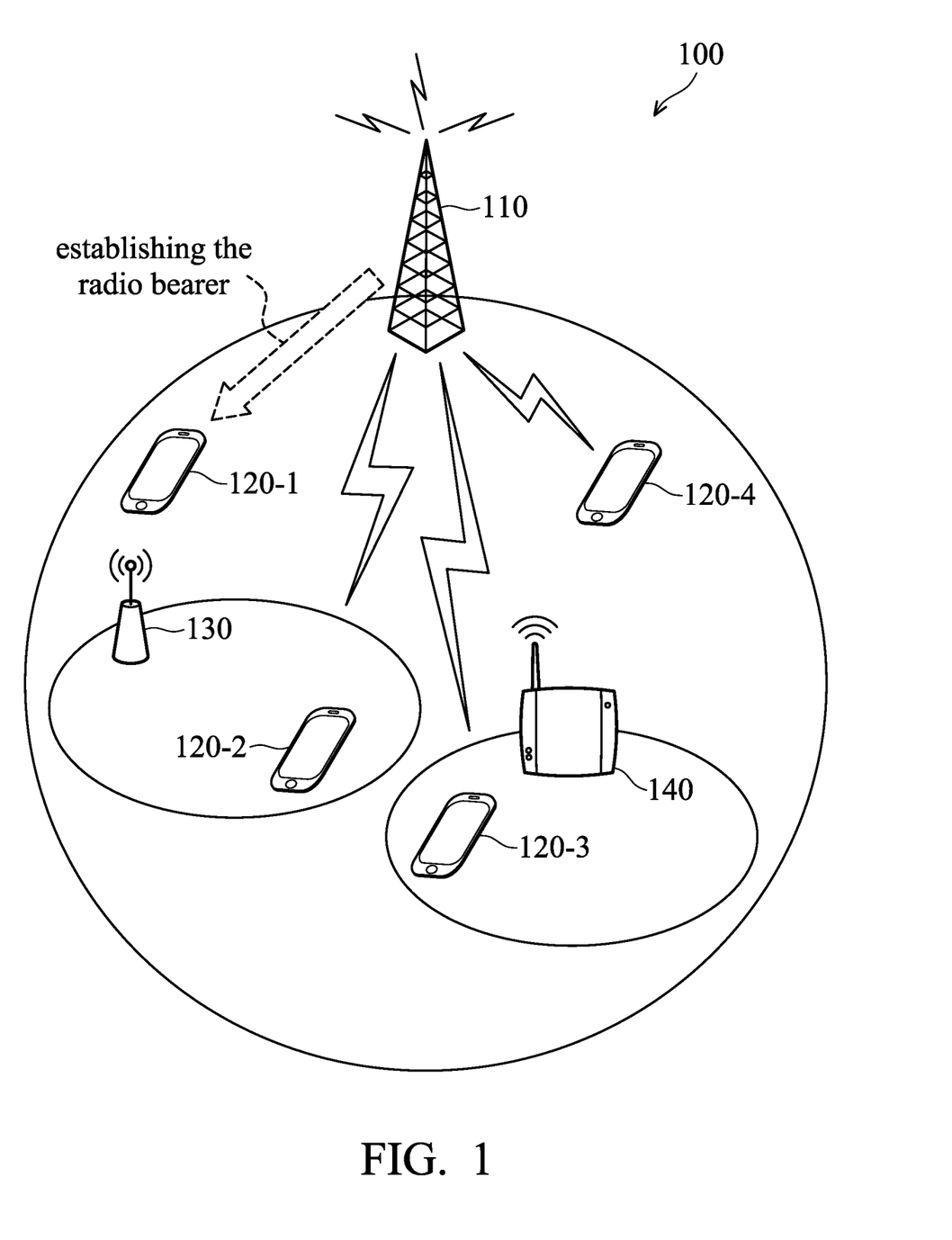
FIG. 1 is a block diagram of a wireless communication system 100 according to an embodiment of the disclosure.

FIG. 1 is a block diagram of a wireless communication system 100 according to an embodiment of the disclosure. As shown in FIG. 1, the wireless communication system 100 may include a first radio access node (RAN) 110, a plurality of user equipment (UE) 120-1, 120-2, 120-3 and 120-4, a second RAN 130 and a third RAN 140. Note that, FIG. 1 presents a simplified block diagram in which only the elements relevant to the disclosure are shown. However, the disclosure is not limited to what is shown in FIG. 1.

Figure 2:
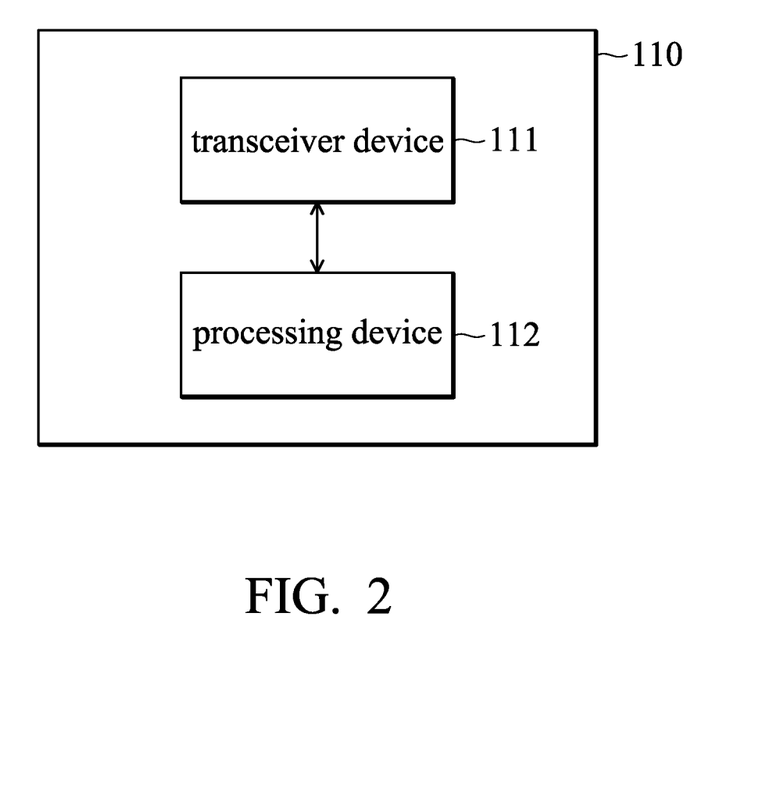
FIG. 2 is a schematic diagram of a multi-cell coordination system 200 according to an embodiment of the disclosure.

FIG. 2 is a block diagram of a first RAN 110 according to an embodiment of the disclosure. According to an embodiment of the disclosure, the first RAN 110 may be a macro eNB, but the disclosure is not limited thereto. As shown in FIG. 2, the first RAN 110 may comprise a transceiver device 111 and a processing device 112. Note that, FIG. 2 presents a simplified block diagram in which only the elements relevant to the disclosure are shown. However, the disclosure is not limited to what is shown in FIG. 2.

According to an embodiment of the disclosure, the transceiver device 111 may be configured to provide a first network (e.g. LTE network) to the UEs 120-1, 120-2, 120-3 and 120-4, receive the measurement reports of the UEs 120-1, 120-2, 120-3 and 120-4. According to an embodiment of the disclosure, the processing device 112 may be configured to perform the related operations of the pre-emption process. According to an embodiment of the disclosure, the measurement report of each UE may comprise the network types which the UE can connect to, the RAN Identifiers (e.g. cell ID), and the signal strengths (e.g. RSRP and RSSI).

According to an embodiment of the disclosure, the second RAN 130 may be a small cell, but the disclosure is not limited thereto. The second RAN 130 may be configured to provide a second network (e.g. Evolved Universal Terrestrial Radio Access (EUTRA) network) to the UE 120-2.

According to an embodiment of the disclosure, the third RAN 140 may be a Wi-Fi access point (AP), but the disclosure is not limited thereto. The third RAN 140 may be configured to provide a third network (e.g. wireless local area network (WLAN) network) to the UE 120-3.

Furthermore, note that, the coverage ranges of the heterogeneous networks (e.g. the networks provided by the second RAN 130 and the third RAN 140) illustrated in the embodiments of the disclosure are smaller than the coverage range of the network provided by the first RAN 110.

According to some embodiments of the disclosure, the UE may be in the coverage ranges of different heterogeneous networks at the same time. For example, the UE may be in the coverage ranges of the second networks provided by the second RAN 130 and the third network provided by the third RAN 140 at the same time.

According to an embodiment of the disclosure, the UEs 120-1, 120-2, 120-3 and 120-4 may measure its current network environment and provide the measurement reports to the first RAN 110. In the embodiment of the disclosure, the measurement report of each UE may comprise the related information between the UE and other heterogeneous networks. According to the measurement report provided by the UE, the first RAN 110 may know whether the UE is in the coverage ranges of other heterogeneous networks and know the related information between the UE and other heterogeneous networks. For example, according to the measurement report provided by the UE 120-2, the first RAN 110 may know the UE 120-2 is also in the coverage range of the second network (e.g. EUTRA network) provided by the second RAN 130 and know the Cell-ID and the Reference Signal Received Power (RSRP) of the UE 120-2 in the second network. According to the measurement report provided by the UE 120-3, the first RAN 110 may know the UE 120-3 is also in the coverage range of the third network (e.g. WLAN network) provided by the third RAN 140 and know the Service Set Identifier (SSID) and the Received Signal Strength Indication (RSSI) of the UE 120-3 in the third network.

According to the embodiments of the disclosure, according to the Allocation and Retention Priority (ARP), different UE bearers may have different priorities. The ARP is defined in the 3GPP standard, and is comprised in the Quality of Service (QoS) parameters. The APR is utilized to define the priorities of different UE bearers, and it comprises three parameters, Priority Level, Pre-emption capability and Pre-emption vulnerability.

The Priority Level is utilized to define the priority levels 0-15 from high priority to low priority. Taking FIG. 1 for example, it assumed that the priority level corresponding to the UE 120-1 is priority level 1, the priority level corresponding to the UE 120-2 is priority level 9, the priority level corresponding to the UE 120-3 is priority level 10 and the priority level corresponding to the UE 120-4 is priority level 11. The Pre-emption capability is utilized to determine whether to pre-empt the UE bearer with lower priority level to release required wireless resource. Taking FIG. 1 for example, when the Pre-emption capability of the UE bearer of the UE 120-1 is set to TRUE, it means that the UE 120-1 needs to pre-empt the wireless resource of the UE bearer with lower priority level. The Pre-emption vulnerability is utilized to determine whether the UE bearer is easily pre-empted by the UE bearer with higher priority level and the pre-emption capability (i.e. the re-emption capability of the UE bearer is set to TRUE). Taking FIG. 1 for example, when the Pre-emption vulnerability of the UE bearer of the UE 120-2 is set to TRUE, it means that the UE bearer of the UE 120-2 is easily pre-empted by the UE bearer with a higher priority level and the pre-emption capability.

In conventional pre-emption technology, the RAN (e.g. RAN 110) may release the wireless resource of the UE bearer with lower priority level to the UE bearer with higher priority level according to the ARP parameters. However, in the embodiments of the disclosure, the RAN may further concern whether the UE corresponding the UE bearer with lower priority level is in the coverage range of at least one other heterogeneous network to determine whether to perform the pre-emption for the UE. The details will be illustrated in the embodiments below.

According to some embodiments of the disclosure, "the pre-emption process is triggered" means that when a UE with higher priority level (e.g. UE 120-1) wants to establish a radio bearer in the first network, and the wireless resource of the first network is not enough, the pre-emption process will be triggered to provide the wireless resource to the UE with high priority level. According to other embodiments of the disclosure, "the pre-emption process is triggered" means that when a UE with higher priority level (e.g. UE 120-1) asks the first RAN 110 for more wireless resource, and the wireless resource of the first network is not enough, the pre-emption process will be triggered to provide the wireless resource to the UE with high priority level.

According to an embodiment of the disclosure, as shown in FIG. 1, when the pre-emption process is triggered (e.g. the UE 120-1 with higher priority level wants to establish a radio bearer in the first network, and the wireless resource of the first network is not enough), the first RAN 110 may determine whether the UEs 120-2, 120-3 and 120-4 corresponding to the UE bearers with lower priority levels are in the coverage ranges of other heterogeneous networks first. Then, the first RAN 110 may select one UE bearer to perform the pre-emption from the UE bearer corresponding to the UEs 120-2 and 120-3 which are in the coverage ranges of other heterogeneous networks. Although the UE 120-4 corresponds to the lowest priority level, the UE 120-4 is not in the coverage ranges of other heterogeneous networks. Therefore, when the first RAN 110 selects the UE to perform the pre-emption, the UE 120-4 will be excluded by the first RAN 110 first.

According to some embodiments of the disclosure, the RAN 110 may further select a plurality of the UE bearers with the lowest priority level in the first network to be the candidate UE bearers for the pre-emption process first. For example, if in the first network, the priority level 11 is the lowest priority level, the RAN 110 may select the UE bearers with the priority level 11 in the first network to be the candidate UE bearers for the pre-emption process first.

According to other embodiments of the disclosure, the RAN 110 may further select a plurality of the UE bearers corresponding to the lowest priority level range in the first network to be the candidate UE bearers for the pre-emption process first. For example, if in the first network, the lowest priority level range is the priority levels 10~15, the RAN 110 may select the UE bearers corresponding to the priority levels 10~15 in the first network to be the candidate UE bearers for the pre-emption process first.

According to an embodiment of the disclosure, when the pre-emption process is triggered (e.g. the UE 120-1 with higher priority level wants to establish a radio bearer in the first network, and the wireless resource of the first network is not enough), the first RAN 110 may determine whether the UEs corresponding to the candidate UE bearers are in the coverage ranges of other heterogeneous networks first. Then, the first RAN 110 may select one candidate UE bearer to perform the pre-emption from the candidate UE bearers corresponding to the UEs which are in the coverage ranges of other heterogeneous networks.

According to an embodiment of the disclosure, for the candidate UE bearers corresponding to the UEs which are in the coverage ranges of other heterogeneous networks, the RAN 110 may further determine whether a first signal strength (e.g. RSRP) between each UE (wherein the UE can connect to the second network (e.g. the EUTRA network provided by the small cell)) and the second network is greater than a first threshold (e.g. −90 dBm, but the disclosure is not limited thereto). Then, the RAN 110 may select one candidate UE bearer from the candidate UE bearers corresponding to the UEs whose first signal strengths are greater than the first threshold to perform the pre-emption.

If all of the first signal strengths (e.g. RSRP) between each UE (wherein the UE can connect to the second network (e.g. the EUTRA network provided by the small cell)) and the second network are not greater than the first threshold, the RAN 110 may further determine whether a second signal strength (e.g. RSSI) between each UE (wherein the UE can connect to the third network (e.g. the WLAN network provided by the Wi-Fi access point)) and the third network is greater than a second threshold (e.g. −70 dBm, but the disclosure is not limited thereto). Then, the RAN 110 may select one candidate UE bearer from the candidate UE bearers corresponding to the UEs whose second signal strengths are greater than the second threshold to perform the pre-emption. If all of the second signal strengths (e.g. RSSI) between each UE (wherein the UE can connect to the third network (e.g. WLAN network provided by the Wi-Fi access point)) and the third network are not greater than the second threshold, the RAN 110 may randomly select one candidate UE bearer from all of the candidate UE bearers to perform the pre-emption.

Taking table 1 for example, the Cell Radio Network Temporary Identifier (C-RNTI) of the UEs corresponding to the candidate UE bearers are 0001, 0002, 0003 and 0004. According to table 1, the UE 0002 and the UE 0004 are in the coverage range of the EUTRA network provided by the small cell, and the UE 0003 and the UE 0004 are in the coverage range of the WLAN network provided by the Wi-Fi access point. Furthermore, because the UE 0001 is not in the coverage ranges of other heterogeneous networks, when the first RAN 110 selects the UE with the lower priority level to perform the pre-emption, the UE 0001 will be excluded by the first RAN 110 first. According to the embodiment, the RAN 110 may determine whether a first signal strength (e.g. RSRP) between each UE (e.g. the UE 0002 and the UE 0004 which can connect to the second network (e.g. the EUTRA network provided by the small cell)) and the second network is greater than a first threshold (e.g. −90 dBm) first. When the RAN 110 determine whether the first signal strengths between UE 0002 and the second network and between the UE 0004 and the second network are greater than the first threshold (e.g. −90 dBm), because only the RSRP of the UE 0002 is greater than −90 dBm, the first RAN 110 may select the UE barer of the UE 0002 to perform the pre-emption.

TABLE 1

| | Serving network (LTE network) | | | EUTRA network | | WLAN network | | |
|---|---|---|---|---|---|---|---|---|
| C-RNTI | Cell ID | Bearer ID | Priority level | Cell ID | RSRP (dBm) | SSID | RSSI (dBm) | Pre-empt? |
| 0001 | 1 | 5 | 12 | N/A | N/A | N/A | N/A | No |
| 0002 | 1 | 5 | 10 | 2 | −80 | N/A | N/A | Yes |
|  |  |  |  | 3 | −90 |  |  |  |
| 0003 | 1 | 5 | 9 | N/A | N/A | 1 | −30 | No |
|  |  |  |  |  |  | 2 | −60 |  |
| 0004 | 1 | 5 | 11 | 4 | −100 | 3 | −80 | No |
|  |  |  |  | 5 | −110 | 4 | −90 |  |

According to an embodiment of the disclosure, when one of the candidate UE bearers is pre-empted, the RAN 110 may assist the UE corresponding to the pre-empted candidate UE bearer in connecting to another heterogeneous network which it can connect to. Taking FIG. 1 for example, if the RAN 110 selects the UE bearer of the UE 120-2 to perform the pre-emption, the RAN 110 may assist the UE 120-2 in connecting to the second network provided by the second RAN 130.

Figure 3:
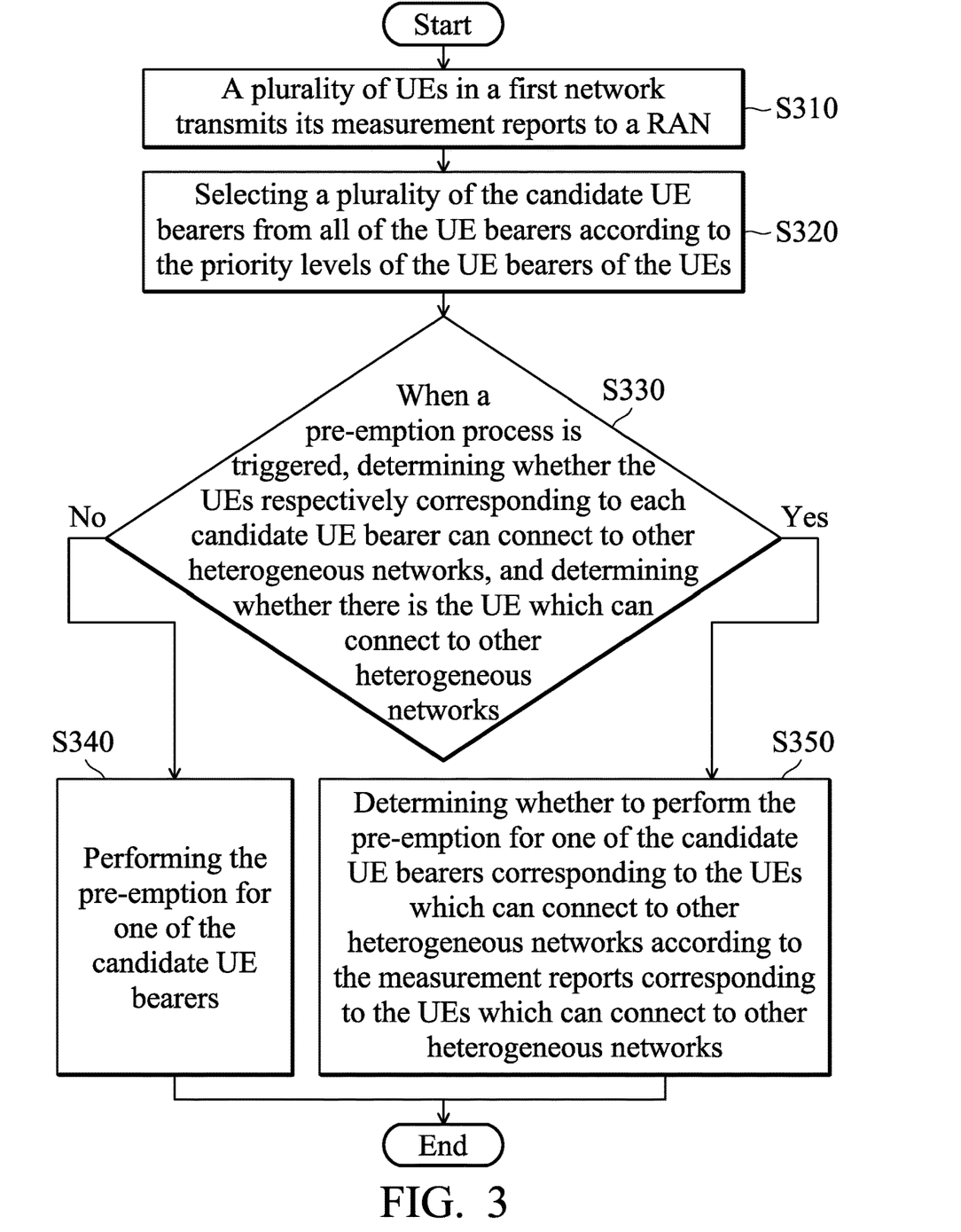
FIG. 3 is a flowchart illustrating a method for pre-empting the wireless resource according to an embodiment of the disclosure.

FIG. 3 is a flowchart illustrating a method for pre-empting the wireless resource according to an embodiment of the disclosure. The method for pre-empting the wireless resource can be applied to a wireless communication system (e.g. the wireless communication system 100) which comprises a RAN and a plurality of UEs. As shown in FIG. 3, in step S310, a plurality of UEs in a first network may transmit its measurement reports to a RAN, wherein the first network is provided by the RAN. In step S320, the RAN may select a plurality of the candidate UE bearers from all of the UE bearers according to the priority levels of the UE bearers of the UEs. In step S330, when a pre-emption process is triggered, the RAN may determine whether the UEs respectively corresponding to each candidate UE bearer can connect to other heterogeneous networks (i.e. in the coverage range of other heterogeneous networks), and determine whether there is the UE which can connect to other heterogeneous networks. If all of the UEs respectively corresponding to each candidate UE bearer cannot connect to other heterogeneous networks, step S340 is performed. In step S340, the RAN may perform the pre-emption for one of the candidate UE bearers. If one or more of the UEs corresponding to the candidate UE bearers can connect to other heterogeneous networks, step S350 is performed. In step S350, the RAN may determine whether to perform the pre-emption for one of the candidate UE bearers corresponding to the UEs which can connect to other heterogeneous networks according to the measurement reports corresponding to the UEs which can connect to other heterogeneous networks.

According to some embodiments of the disclosure, in step S320, the RAN may select a plurality of the UE bearers with the lowest priority level from all UE bearers to be the candidate UE bearers for the pre-emption process according to the priority level of each UE bearer or select a plurality of the UE bearers corresponding to a lowest priority level range from all UE bearers to be the candidate UE bearers for the pre-emption process according to the priority level of each UE bearer.

Figure 4A:
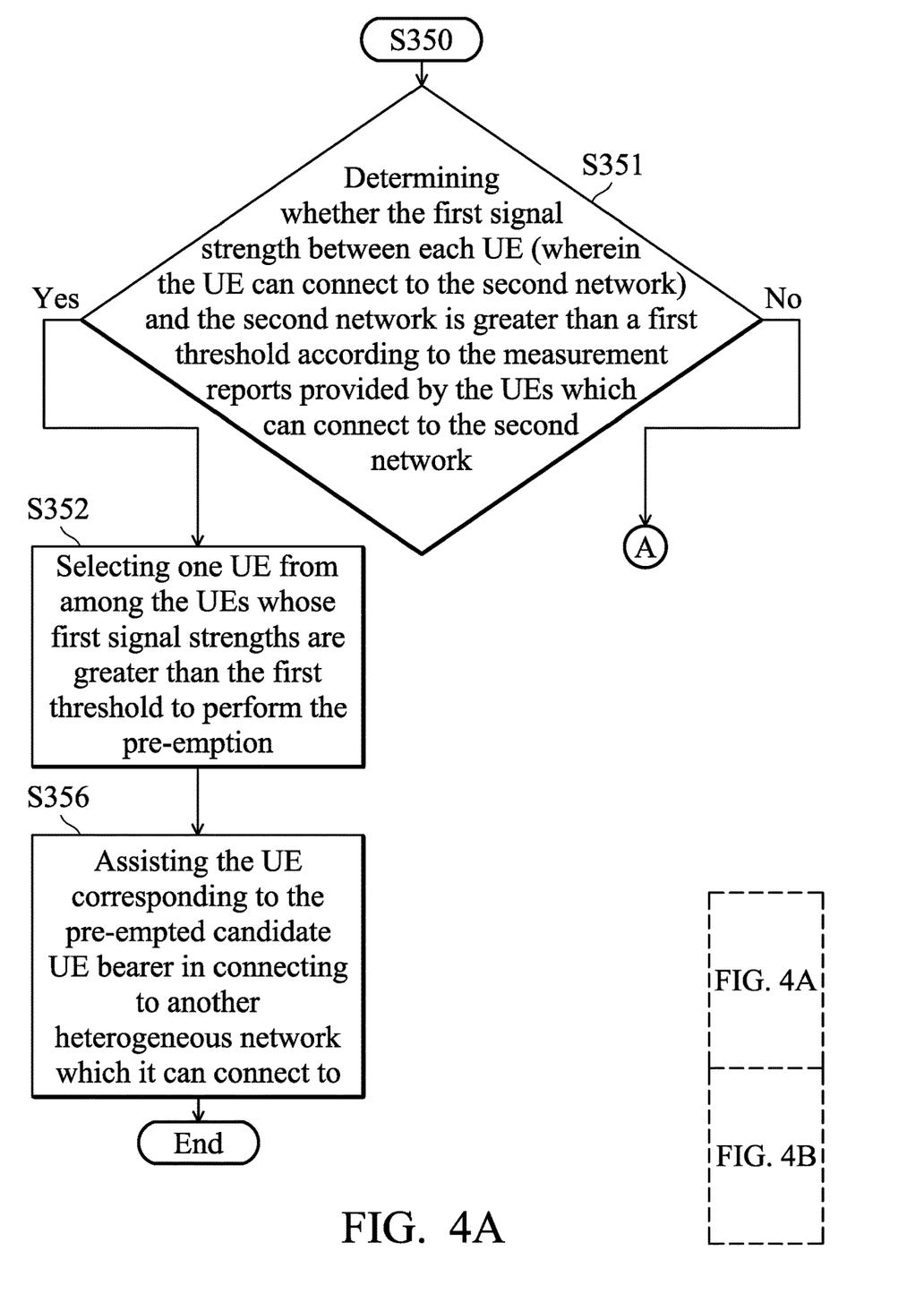
FIGS. 4A-4B is a flowchart illustrating a method for pre-empting the wireless resource according to an embodiment of the disclosure.
Figure 4B:
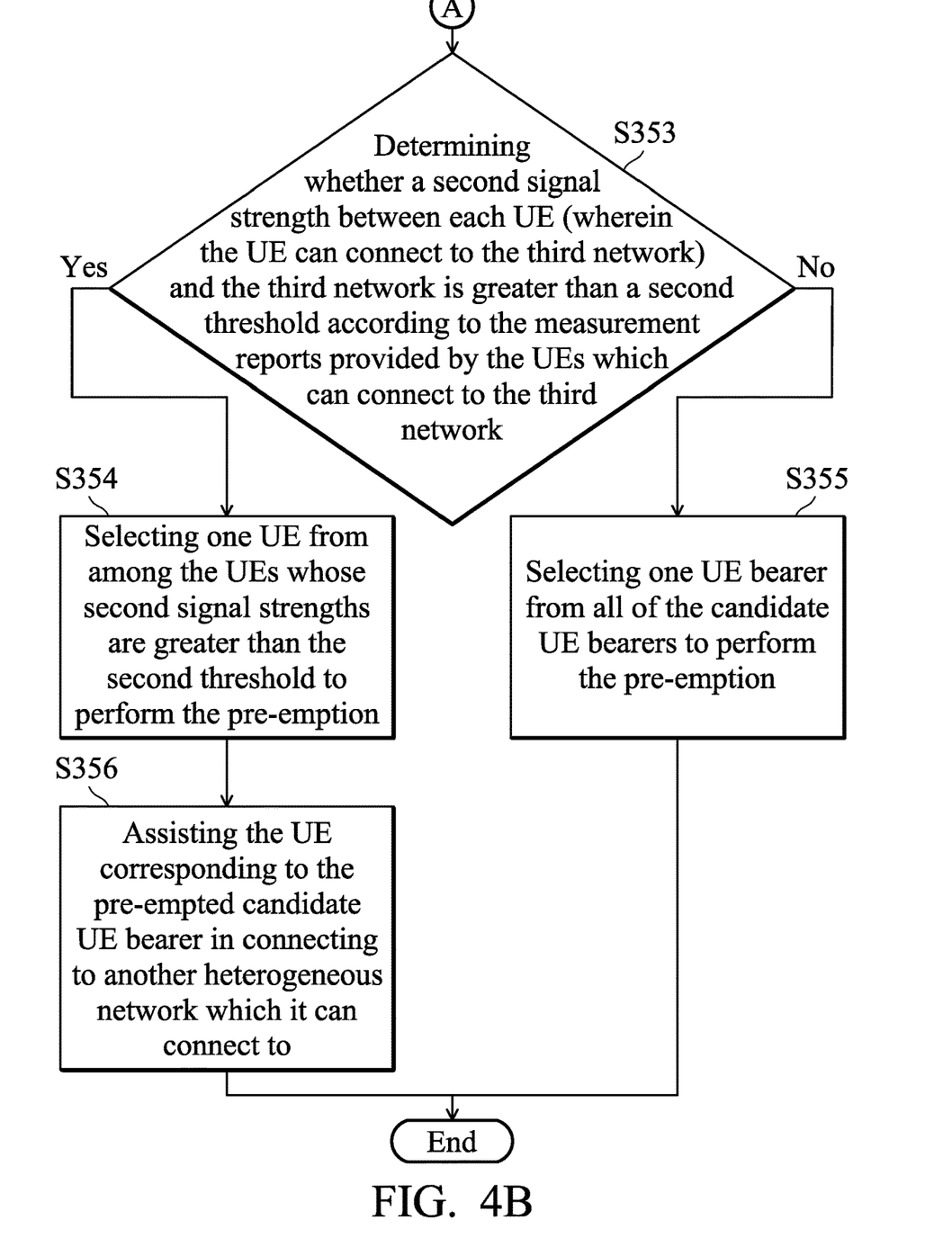

FIGS. 4A-4B is a flowchart illustrating step S350 according to an embodiment of the disclosure. As shown FIGS. 4A-4B, in step S351, the RAN may determine whether the first signal strength (e.g. RSRP) between each UE (wherein the UE can connect to the second network (e.g. the EUTRA network provided by the small cell)) and the second network is greater than a first threshold according to the measurement reports provided by the UEs which can connect to the second network. If there are any UEs whose first signal strengths are greater than the first threshold, step S352 is performed. In step S352, the RAN may select one UE from among the UEs whose first signal strengths are greater than the first threshold to perform the pre-emption. When all of the first signal strengths between each UE (wherein the UE can connect to the second network) and the second network are not greater than the first threshold, step S353 is performed. In step S353, the RAN may determine whether a second signal strength (e.g. RSSI) between each UE (wherein the UE can connect to the third network (e.g. the WLAN network provided by the Wi-Fi access point)) and the third network is greater than a second threshold according to the measurement reports provided by the UEs which can connect to the third network.

If there are any UEs whose second signal strengths are greater than the second threshold, step S354 is performed. In step S354, the RAN may select one UE from among the UEs whose second signal strengths are greater than the second threshold to perform the pre-emption. When all of the second signal strengths between each UE (wherein the UE can connect to the third network) and the third network are not greater than the first threshold, step S355 is performed. In step S355, the RAN may select one UE bearer from all of the candidate UE bearers to perform the pre-emption.

In step S356, the RAN may assist the UE corresponding to the pre-empted candidate UE bearer in connecting to another heterogeneous network which it can connect to.

Figure 5:
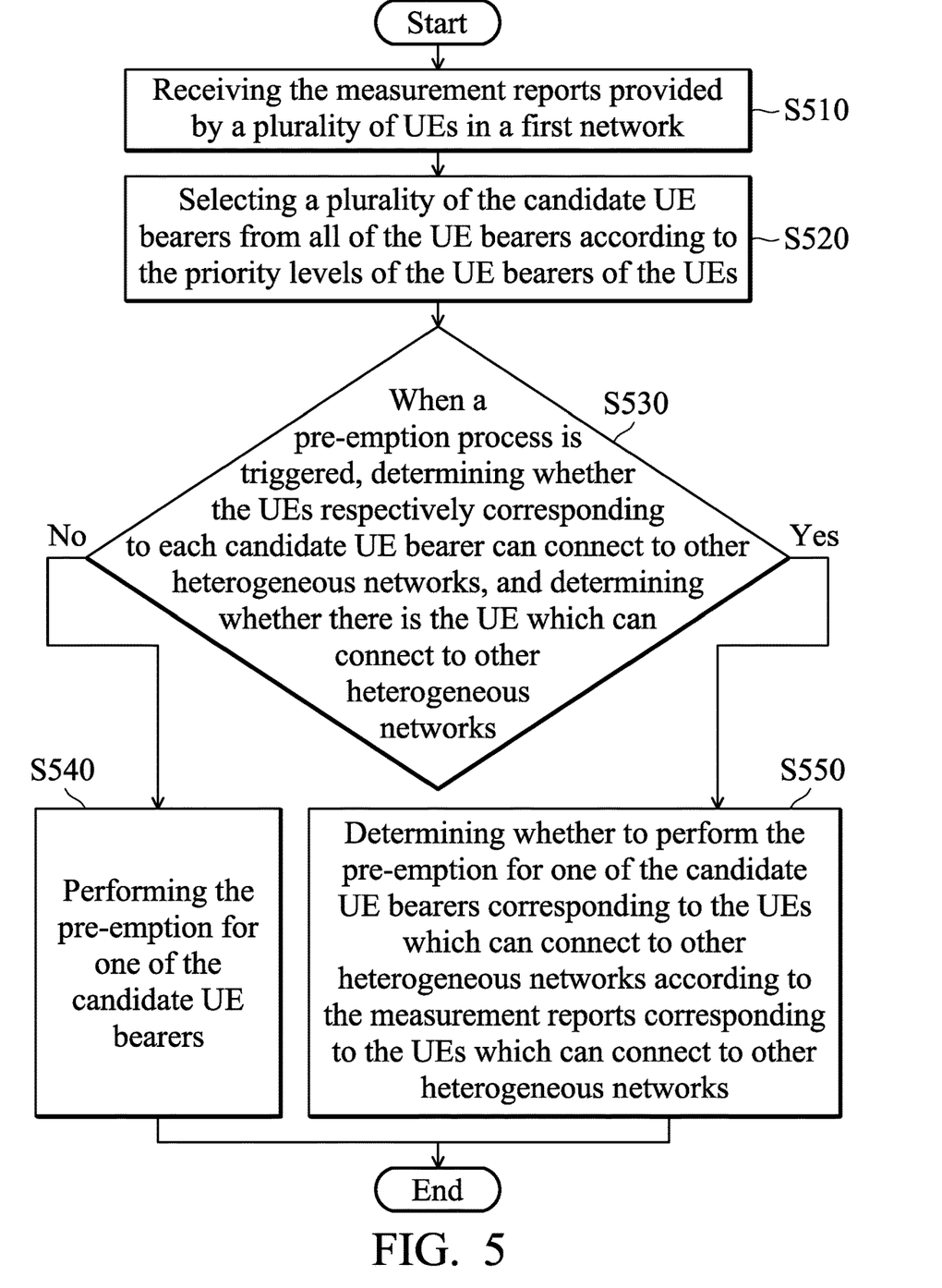
FIG. 5 is a flowchart illustrating a method for pre-empting the wireless resource according to an embodiment of the disclosure.

FIG. 5 is a flowchart illustrating a method for pre-empting the wireless resource according to an embodiment of the disclosure. The method for pre-empting the wireless resource can be applied to a RAN (e.g. the RAN 110). As shown in FIG. 5, in step S510, the RAN 110 may receive the measurement reports provided by a plurality of UEs in a first network, wherein the first network is provided by the RAN. In step S520, the RAN 100 may select a plurality of the candidate UE bearers from all of the UE bearers according to the priority levels of the UE bearers of the UEs. In step S530, when a pre-emption process is triggered, the RAN 110 may determine whether the UEs respectively corresponding to each candidate UE bearer can connect to other heterogeneous networks (i.e. in the coverage range of other heterogeneous networks), and determine whether there is the UE which can connect to other heterogeneous networks. If all of the UEs respectively corresponding to each candidate UE bearer cannot connect to other heterogeneous networks, step S540 is performed. In step S540, the RAN 110 may perform the pre-emption for one of the candidate UE bearers. If one or more of the UEs corresponding to the candidate UE bearers can connect to other heterogeneous networks, step S550 is performed. In step S550, the RAN 110 may determine whether to perform the pre-emption for one of the candidate UE bearers corresponding to the UEs which can connect to other heterogeneous networks according to the measurement reports corresponding to the UEs which can connect to other heterogeneous networks.

In conventional pre-emption technology, the RAN (e.g. the RAN 110) may only release the wireless resource of the UE bearer with lower priority level to the UE bearer with higher priority level according to the ARP. However, in the methods for pre-empting the wireless resource of the disclosure, the RAN may further concern whether the UE corresponding to the UE bearer with lower priority level is in the coverage ranges of other heterogeneous networks to determine whether to pre-empt the UE bearer of the UE. Therefore, it can be avoided that when the wireless resource of the UE bearer with lower priority level is pre-empted, the UE may not connect to other heterogeneous networks to access the internet continuously.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Accordingly, the teaching of the disclosure may be accomplished by many methods, and any configurations or functions in the disclosed embodiments only present a representative condition. Those who are skilled in this technology will understand that all of the disclosed aspects in the disclosure may be applied independently or be incorporated.

While the disclosure has been described by way of example and as exemplary embodiments only, it should be understood that the disclosure is not configured to limit thereto. Those who are skilled in this technology can still make various alterations and modifications without departing from the scope and spirit of this disclosure. Therefore, the scope of the invention shall be defined and protected by the following claims and their equivalents.

What is claimed is:

1. A method for pre-empting the wireless resource, applied to a wireless communication system, comprising:
   transmitting, by a plurality of user equipment (UEs), measurement reports of the UEs to a radio access node (RAN) in a first network, wherein the first network is provided by the RAN;
   according to priority levels of UE bearers corresponding to each of the UEs, selecting a plurality of candidate UE bearers from all of the UE bearers;
   according to the measurement reports of the UEs corresponding to the candidate UE bearers, determining whether the UEs corresponding to each of the candidate UE bearers are able to connect to other heterogeneous networks; and
   selecting one of the candidate UE bearers corresponding to the UEs which are able to connect to other heterogeneous networks to perform a pre-emption.

2. The method for pre-empting the wireless resource of claim 1, further comprising:
   according to the priority levels of the UE bearers corresponding to each of the UEs, selecting the UE bearers with the lowest priority level from all of the UE bearers, or selecting the UE bearers which are in a lowest priority level range from all of the UE bearers.

3. The method for pre-empting the wireless resource of claim 1, wherein the measurement report of each UE comprises network types which the UE can connect to, RAN Identifiers, and signal strengths.

4. The method for pre-empting the wireless resource of claim 1, further comprising:
   determining whether a first signal strength between each UE, which corresponds to the candidate UE bearer and can connect to the second network, and the second network is greater than a first threshold according to the measurement reports of the UEs corresponding to the candidate UE bearers; and
   when there are UEs whose first signal strengths are greater than the first threshold, selecting one UE from among the UEs whose first signal strengths are greater than the first threshold to perform the pre-emption.

5. The method for pre-empting the wireless resource of claim 4, further comprising:
   when all of the first signal strengths between each UE, which corresponds to the candidate UE bearer and can connect to the second network, and the second network are not greater than the first threshold, determining whether a second signal strength between each UE, which corresponds to the candidate UE bearer and can connect to a third network, and the third network is greater than a second threshold according to the measurement reports provided by the UEs which can connect to the third network; and
   when there are UEs whose second signal strengths are greater than the second threshold, selecting one UE from among the UEs whose second signal strengths are greater than the second threshold to perform the pre-emption.

6. The method for pre-empting the wireless resource of claim 5, further comprising:
   when all of the second signal strengths between each UE, which corresponds to the candidate UE bearer and can connect to the third network, and the third network are not greater than the second threshold, selecting one UE bearer from all of the candidate UE bearers to perform the pre-emption.

7. The method for pre-empting the wireless resource of claim 1, further comprising:
when one of the candidate UE bearers is pre-empted, assisting, by the RAN, the UE corresponding to the pre-empted candidate UE bearer in connecting to another heterogeneous network which it can connect to.

8. A method for pre-empting the wireless resource, applied to a radio access node (RAN), comprising:
receiving measurement reports of a plurality of user equipment (UEs) in a first network, wherein the first network is provided by the RAN;
according to priority levels of UE bearers corresponding to each of the UEs, selecting a plurality of candidate UE bearers from all of the UE bearers;
according to the measurement reports of the UEs corresponding to the candidate UE bearers, determining whether the UEs corresponding to each of the candidate UE bearers are able to connect to other heterogeneous networks; and
selecting one of the candidate UE bearers corresponding to the UEs which are able to connect to other heterogeneous networks to perform a pre-emption.

9. The method for pre-empting the wireless resource of claim 8, further comprising:
according to the priority levels of the UE bearers corresponding to each of the UEs, selecting the UE bearers with the lowest priority level from all of the UE bearers, or selecting the UE bearers which are in a lowest priority level range from all of the UE bearers.

10. The method for pre-empting the wireless resource of claim 8, wherein the measurement report of each UE comprises network types which the UE can connect to, RAN Identifiers, and signal strengths.

11. The method for pre-empting the wireless resource of claim 8, the step further comprising:
determining whether a first signal strength between each UE, which corresponds to the candidate UE bearer and can connect to the second network, and the second network is greater than a first threshold according to the measurement reports of the UEs corresponding to the candidate UE bearers; and
when there are UEs whose first signal strengths are greater than the first threshold, selecting one UE from among the UEs whose first signal strengths are greater than the first threshold to perform the pre-emption.

12. The method for pre-empting the wireless resource of claim 11, further comprising:
when all of the first signal strengths between each UE, which corresponds to the candidate UE bearer and can connect to the second network, and the second network are not greater than the first threshold, determining whether a second signal strength between each UE, which corresponds to the candidate UE bearer and can connect to a third network, and the third network is greater than a second threshold according to the measurement reports provided by the UEs which can connect to the third network; and
when there are UEs whose second signal strengths are greater than the second threshold, selecting one UE from among the UEs whose second signal strengths are greater than the second threshold to perform the pre-emption.

13. The method for pre-empting the wireless resource of claim 12, further comprising:
when all of the second signal strengths between each UE, which corresponds to the candidate UE bearer and can connect to the third network, and the third network are not greater than the second threshold, selecting one UE bearer from all of the candidate UE bearers to perform the pre-emption.

14. The method for pre-empting the wireless resource of claim 8, further comprising:
when one of the candidate UE bearers is pre-empted, assisting, by the RAN, the UE corresponding to the pre-empted candidate UE bearer in connecting to another heterogeneous network which it can connect to.

15. A wireless communication system, comprising:
a plurality of user equipment (UEs); and
a radio access node (RAN), providing a first network to the UEs, receiving measurement reports of the UEs, and according to priority levels of UE bearers corresponding to each of the UEs, selecting a plurality of candidate UE bearers from all of the UE bearers,
wherein the RAN determines whether the UEs corresponding to each of the candidate UE bearers are able to connect to other heterogeneous networks, and according to the measurement reports of the UEs which are able to connect to other heterogeneous networks, the RAN selects one of the candidate UE bearers corresponding to the UEs which are able to connect to other heterogeneous networks to perform a pre-emption.

16. The wireless communication system of claim 15, wherein according to the priority levels of the UE bearers corresponding to each of the UEs, the RAN selects the UE bearers with the lowest priority level from all of the UE bearers, or selects the UE bearers which are in a lowest priority level range from all of the UE bearers.

17. The wireless communication system of claim 15, wherein the measurement report of each UE comprises network types which the UE can connect to, RAN Identifiers, and signal strengths.

18. The wireless communication system of claim 15, wherein the RAN determines whether a first signal strength between each UE, which corresponds to the candidate UE bearer and can connect to the second network, and the second network is greater than a first threshold according to the measurement reports of the UEs corresponding to the candidate UE bearers, and wherein when there are UEs whose first signal strengths are greater than the first threshold, the RAN selects one UE from among the UEs whose first signal strengths are greater than the first threshold to perform the pre-emption.

19. The wireless communication system of claim 18, wherein when all of the first signal strengths between each UE, which corresponds to the candidate UE bearer and can connect to the second network, and the second network are not greater than the first threshold, the RAN determines whether a second signal strength between each UE, which corresponds to the candidate UE bearer and can connect to a third network, and the third network is greater than a second threshold according to the measurement reports provided by the UEs which can connect to the third network, and wherein when there are UEs whose second signal strengths are greater than the second threshold, the RAN selects one UE from among the UEs whose second signal strengths are greater than the second threshold to perform the pre-emption.

20. The wireless communication system of claim 19, wherein when all of the second signal strengths between each UE, which corresponds to the candidate UE bearer and can connect to the third network, and the third network are not greater than the second threshold, the RAN selects one UE bearer from all of the candidate UE bearers to perform the pre-emption.

21. The wireless communication system of claim 15, wherein when one of the candidate UE bearers is pre-empted, the RAN assists the UE corresponding to the pre-empted candidate UE bearer in connecting to another heterogeneous network which it can connect to.

22. A radio access node (RAN), comprising:
a transceiver device, providing a first network to a plurality of user equipment (UEs) and receiving measurement reports of the UEs; and
a processing device, selecting a plurality of candidate UE bearers from all of the UE bearers according to priority levels of the UE bearers corresponding to each of the UEs,
wherein the processing device determines whether the UEs corresponding to each of the candidate UE bearers are able to connect to other heterogeneous networks, and according to the measurement reports of the UEs which are able to connect to other heterogeneous networks, the processing device selects one of the candidate UE bearers corresponding to the UEs which are able to connect to other heterogeneous networks to perform a pre-emption.

23. The radio access node of claim 22, wherein according to the priority levels of the UE bearers corresponding to each of the UEs, the processing device selects the UE bearers with the lowest priority level from all of the UE bearers, or selects the UE bearers which are in a lowest priority level range from all of the UE bearers.

24. The radio access node of claim 22, wherein the measurement report of each UE comprises network types which the UE can connect to, RAN Identifiers, and signal strengths.

25. The radio access node of claim 22, wherein the processing device determines whether a first signal strength between each UE, which corresponds to the candidate UE bearer and can connect to the second network, and the second network is greater than a first threshold according to the measurement reports of the UEs corresponding to the candidate UE bearers, and wherein when there are UEs whose first signal strengths are greater than the first threshold, the processing device selects one UE from among the UEs whose first signal strengths are greater than the first threshold to perform the pre-emption.

26. The radio access node of claim 25, wherein when all of the first signal strengths between each UE, which corresponds to the candidate UE bearer and can connect to the second network, and the second network are not greater than the first threshold, the processing device determines whether a second signal strength between each UE, which corresponds to the candidate UE bearer and can connect to a third network, and the third network is greater than a second threshold according to the measurement reports provided by the UEs which can connect to the third network, and wherein when there are UEs whose second signal strengths are greater than the second threshold, the processing device selects one UE from among the UEs whose second signal strengths are greater than the second threshold to perform the pre-emption.

27. The radio access node of claim 26, wherein when all of the second signal strengths between each UE, which corresponds to the candidate UE bearer and can connect to the third network, and the third network are not greater than the second threshold, the processing device selects one UE bearer from all of the candidate UE bearers to perform the pre-emption.

28. The radio access node of claim 22, wherein when one of the candidate UE bearers is pre-empted, the processing device assists the UE corresponding to the pre-empted candidate UE bearer in connecting to another heterogeneous network which it can connect to.

* * * * *